United States Patent [19]

Iwasa et al.

[11] 3,992,650

[45] Nov. 16, 1976

[54] APPARATUS TO PREVENT OVERCURRENT OR OVERVOLTAGE

[75] Inventors: Hitoo Iwasa, Takatsuki; Gota Kano, Nagaoka, both of Japan

[73] Assignee: Matsushita Electric Industrial Co., Ltd., Kadoma, Japan

[22] Filed: Jan. 29, 1975

[21] Appl. No.: 545,165

[30] Foreign Application Priority Data

Feb. 4, 1974 Japan................................ 49-14807

[52] U.S. Cl................................. 317/33 R; 317/16; 317/31; 317/33 VR; 323/9; 307/289; 307/251

[51] Int. Cl.²......................................... H02H 3/08

[58] Field of Search......... 317/31, 16, 33 R, 33 VR, 317/33 SC, 50, 20; 323/9, 4; 307/202 R, 251, 250, 258, 288, 289

[56] References Cited
UNITED STATES PATENTS

| | | | |
|---|---|---|---|
| 3,234,453 | 2/1966 | Klees et al. | 323/9 X |
| 3,369,129 | 2/1968 | Wolterman | 323/9 |
| 3,521,087 | 7/1970 | Lombardi | 307/202 X |
| 3,603,811 | 9/1971 | Day et al. | 307/202 X |
| 3,605,728 | 9/1971 | Ogle | 323/9 X |
| 3,654,518 | 4/1972 | Phelps et al. | 317/33 R |
| 3,714,512 | 1/1973 | Grabowski | 323/9 X |

OTHER PUBLICATIONS

"Negative Resistance Circuit Using Two Complementary Field Effect Transistors," Recording of the IEEE, 1965, p. 404, Apr. 1965, by Ostefjells.
"Synthesis of Electronic Bistable Circuits" p. 25–35 of IEEE Transactions on Circuit Theory, Mar. 1968, Hill, Pederson, Pepper.

*Primary Examiner*—J D Miller
*Assistant Examiner*—Patrick R. Salce
*Attorney, Agent, or Firm*—Cushman, Darby & Cushman

[57] ABSTRACT

Across a D.C. power source 1, a load 2, a switching element 4, such as a transistor having a control electrode c (base), and a voltage detection means 5, such as a resistor, are connected in series, and a known negative resistance device 6, having two terminals 31 and 32, is connected by its one terminal 32 to said control electrode c of the switching element 4 and by its other terminal 31 to one end of said series resistor 5 which one end is opposite to that connected to said switching element (4), wherein said negative resistance device 6 comprises, as shown in FIG 2, known complementary connection of a depletion mode n-channel field-effect transistor (FET) and a depletion mode p-channel FET. The FETs are connected from source to source, and from the gate of each to the drain of the other so that when an overcurrent to the load 2 or an overvoltage at the voltage source 1 occurs, voltage across said resistor 5 exceeds a preset value, the negative resistance device 6 is cut-off, thereby cutting off the switching element 4.

7 Claims, 4 Drawing Figures

APPARATUS TO PREVENT OVERCURRENT OR OVERVOLTAGE

BACKGROUND OF THE INVENTION

This invention relates to an apparatus to prevent overcurrent or overvoltage by disconnecting a load from a power source.

More particularly, this invention concerns an apparatus to prevent overcurrent to the load or overvoltage of the power source, by employing a semiconductor negative resistance device which comprises a complementary connection of a pair of FETs.

In electric appliances, in order to prevent overcurrent of the appliance, generally a fuse has been employed. In such an arrangement, when an accidental trouble such as overvoltage in the power source or a short circuit in the load causes overcurrent in the load, the fuse breaks to disconnect the load from the power source. Though the fuse is very popular and cheap, in order to break, a considerable increase of current is required, and therefore it is not sensitive to a moderate overcurrent. Moreover, whenever a fuse is broken by an overcurrent, it is always necessary to replace it with another fuse in order to restore the operation of the appliance, and the replacement is troublesome work. Though other overcurrent prevention means, such as electromagnetic systems and thermal-operation systems have been employed previously, these are neither compact not economical.

SUMMARY OF THE INVENTION

Accordingly, the present invention is directed to a novel apparatus for preventing overcurrent or overvoltage to the load.

The apparatus of the present invention has a high sensitivity in responding to an overcurrent or an overvoltage.

The apparatus of the present invention has high reliability since no mechanical or thermo-operating part is included.

The apparatus of the present invention is very compact and shock-resistant, since the apparatus comprises only semiconductor devices as its principal elements.

The apparatus of the present invention is very economical since no complicated electromagnetic or thermal-operating element is used.

DETAILED DISCLOSURE OF THE INVENTION

Prior to description of the apparatus of the present invention, a negative-resistance device for use in the apparatus of the present invention will be described referring to FIG. 2.

Figure 2:
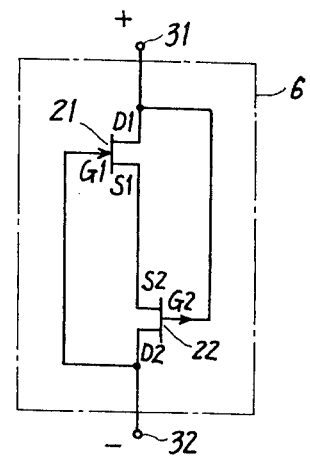
FIG. 2 is a circuit diagram of one example of a negative resistance device employed in the apparatus of the present invention.

FIG. 2 shows a prior art circuit as disclosed, for example, in IEEE Transactions on Circuit Theory, March 1963, pages 25–35 and in Proceedings of The IEEE, April 1965, page 404.

In FIG. 2 the gate electrode G1 of a depletion mode n-channel FET 21 is connected to the drain electrode D2 of a depletion mode p-channel FET 22, and the gate electrode G2 of the p-channel FET 22 is connected to the drain electrode D1 of the n-channel FET 21. The source electrodes S1 and S2 of FETs 21 and 22 are connected to each other.

While the interconnection of the FETs just described has the sources joined together, it is well known that the source and the drain of an FET are quite symmetrical about the gate. Therefore, the FETs can be interconnected in other conventional ways.

Figure 3:
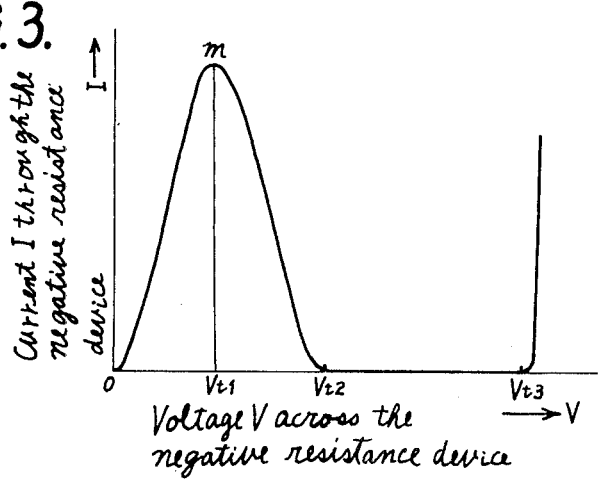
FIG. 3 is a graph indicating voltage-current characteristic of the negative resistance device.

When a voltage V is applied across two outer terminals 31 and 32, i.e., across one drain electrode D1 and the other drain electrode D2 of the series-connected pair of FETs F1 and F2 (with positive potential on the side of electrode D1), a known $\Lambda$ (lambda, a Greek character)-type current-voltage characteristic as shown in FIG. 3 is obtained between voltage V and source current I. As is seen in FIG. 3, for a time from the starting voltage 0, the current I increases showing a positive resistance characteristic as the voltage increases, but the current also shows gradually a saturation characteristic, and after the voltage exceeds the voltage at the peak current point m (i.e., the first threshold voltage $Vt1$), namely, in the region between $Vt1$ and $Vt2$, the current declines as the voltage increases, showing a so-called negative-resistance characteristic. Finally, when the voltage exceeds the second threshold voltage $Vt2$, the current I reaches a cut-off state. This cut-off state of the current continues until the voltage reaches a break-over voltage $Vt3$ where one of the FETs begins to break-down. When the voltage passes the $Vt3$ point, a break-down current is produced. In the circuit arrangement of FIG. 2, there is a first stable "ON" region of $0<V \leq Vt1$, a second stable "OFF" region of $Vt2 \leq V<Vt3$, and an unstable state lying in the applied voltage range of $Vt1<V<Vt2$.

Structure

Figure 1:
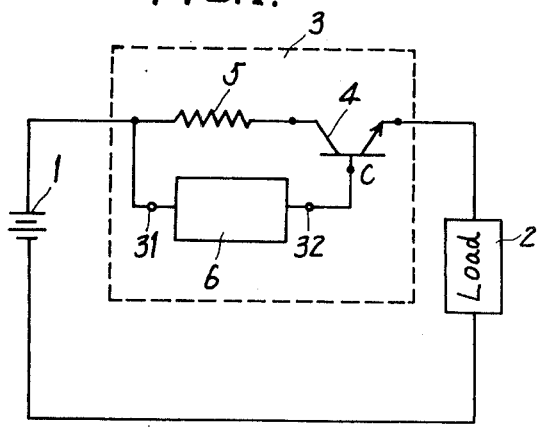
FIG. 1 is a circuit diagram of one example of the present invention.

FIG. 1 is a circuit diagram of one example of the present invention. In FIG. 1, an apparatus 3 to prevent overcurrent or overvoltage 3 according to the present invention is connected in series between a load 2 and a D.C. power source 1, whereby a load current flows through the apparatus 3. The apparatus 3 comprises a transistor 4 as a switching device, the emitter or the collector of which is connected to the load 2. A resistor 5 serves as a voltage detection means which is connected at one end to whichever of the collector or the emitter of said transistor 4 is not joined to the load and which is connected at its other end to one end of the power source 1. A negative resistance device 6 of the type having complementary FETs as described in the above has one end 32 connected to the base of the transistor 4 (the control electrode c of the switching device), and the other end 31 connected to the end of the resistor 5 opposite that connected to the transistor 4.

Operation of the circuit of FIG. 1 is as follows: In Normal State:

When the load works normally and the load current is within a preset range, the voltage appearing across the resistor 5 is proportional to the load current and is within a preset range. This voltage across the resistor 5, together with base-collector voltage of the transistor 4, determines the voltage across the ends of the negative resistance device 6. When the resultant impressed voltage across the negative resistance device 6 is between zero volt and the voltage V$t$2 of FIG. 3, the negative resistance device 6 is conductive, thereby allowing a base current to flow in transistor 4, and resultantly turning the transistor 4 "on". Therefore, current flows normally in the load 2.

In an Overcurrent State:

When the load current increases, then the voltage impressed across the negative resistance device 6 increases. When the impressed voltage is between the voltages V$t$2, and V$t$3, the negative resistance device 6 becomes non-conductive. Accordingly, the transistor 4 switches "off", thereby cutting off the load current.

In an Overvoltage of Power Source:

When the source voltage accidentally increases, in proportion thereto the voltage across the resistor increases, and hence, the voltage impressed across the negative resistance device 6 exceeds the abovementioned voltage V$t$2, and therefore, the negative resistance device 6 becomes non-conductive thereby switching the transistor 4 "off" to cut off the load current.

One Example of the apparatus of FIG. 1 is constituted as follows:

Switching device 4 . . . . . an npn silicon planar type transistor having
$h_{FE} = 100$,
Voltage detection means 5 . . . . . a resistor having the resistance of 400Ω,
Negative resistance device 6 . . . . . consists of
a depletion mode n-channel FET 21 and
a depletion mode p-channel FET 22, connected as shown in FIG. 2, wherein
V$t$1 = 3 volts,
V$t$2 = 7 volts, and
V$t$3 = 25 volts.

The apparatus of the abovementioned Example feeds load current under normal state when:
the power source voltage is within 10 volts, and apparent resistance of the load 2 is over 600Ω, or
the power source voltage is within 10 volts, and the load current is within 10 milli-amperes;
and cuts off the load current when
(overvoltage) the power source voltage exceeds the abovementioned 10 volts, or
(overcurrent) the load current exceeds 10 milli-amperes.

Figure 4:
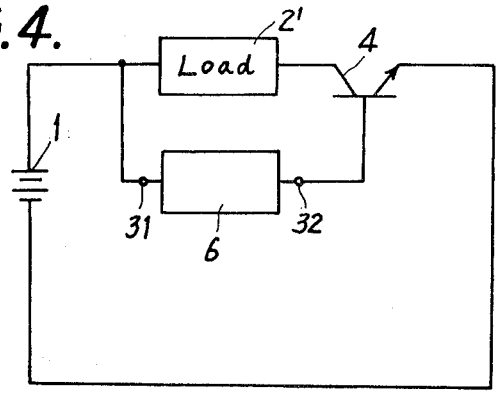
FIG. 4 is a circuit diagram of another example of the present invention.

A modified example is shown in FIG. 4, wherein the voltage detection means 5 is omitted, and in lieu thereof a load 2' is connected in series to the switching device 4. In this example, when an overcurrent flows through the load 2', voltage across the load 2' itself increases, and hence a voltage impressed across the negative resistance device 6 exceeds V$t$2, thereby cutting off the transistor 4.

In place of the abovementioned transistor 4, other switching devices, for instance an FET or multiple-connected transistors, such as a Darlington-connection of transistors, can be employed.

Since the negative resistance device 6, as well as the switching device 4 are semiconductor devices, and the resistor 5 can also be a semiconductor device, the apparatus 3 of the present invention can be entirely a semiconductor device, made as a monolithic semiconductor.

What is claimed is:

1. An apparatus for disconnecting a power source from a load in the event of overcurrent in the load or overvoltage of the source, comprising:
a switching element having an electrode for controlling the passage of current through the element in response to the level of voltage applied to said electrode;
voltage detection means connected in series with said switching element and the voltage source;
a negative resistance device comprising a complementary connection of an n-channel field-effect transistor and a p-channel field-effect transistor, said device being connected at one end to said control electrode and at the other end to an end of the voltage detection means opposite that which is connected to said switching element, said device being operative in response to voltage thereacross to supply voltage to said control electrode.

2. An apparatus as set forth in claim 1, wherein the voltage detection means comprises the load.

3. An apparatus as set forth in claim 1, wherein said switching element is a transistor and wherein the control electrode is the base of the transistor.

4. An apparatus as set forth in claim 3, wherein the voltage detection means comprises the load.

5. An apparatus as set forth in claim 1, wherein said load is connected in series with the voltage detection means, the switching element and the voltage source.

6. An apparatus as set forth in claim 5, wherein said switching element is a transistor and wherein the control electrode is the base of the transistor.

7. An apparatus as set forth in claim 1, wherein the voltage detection means is a resistor.

* * * * *